United States Patent Office 3,280,982
Patented Oct. 25, 1966

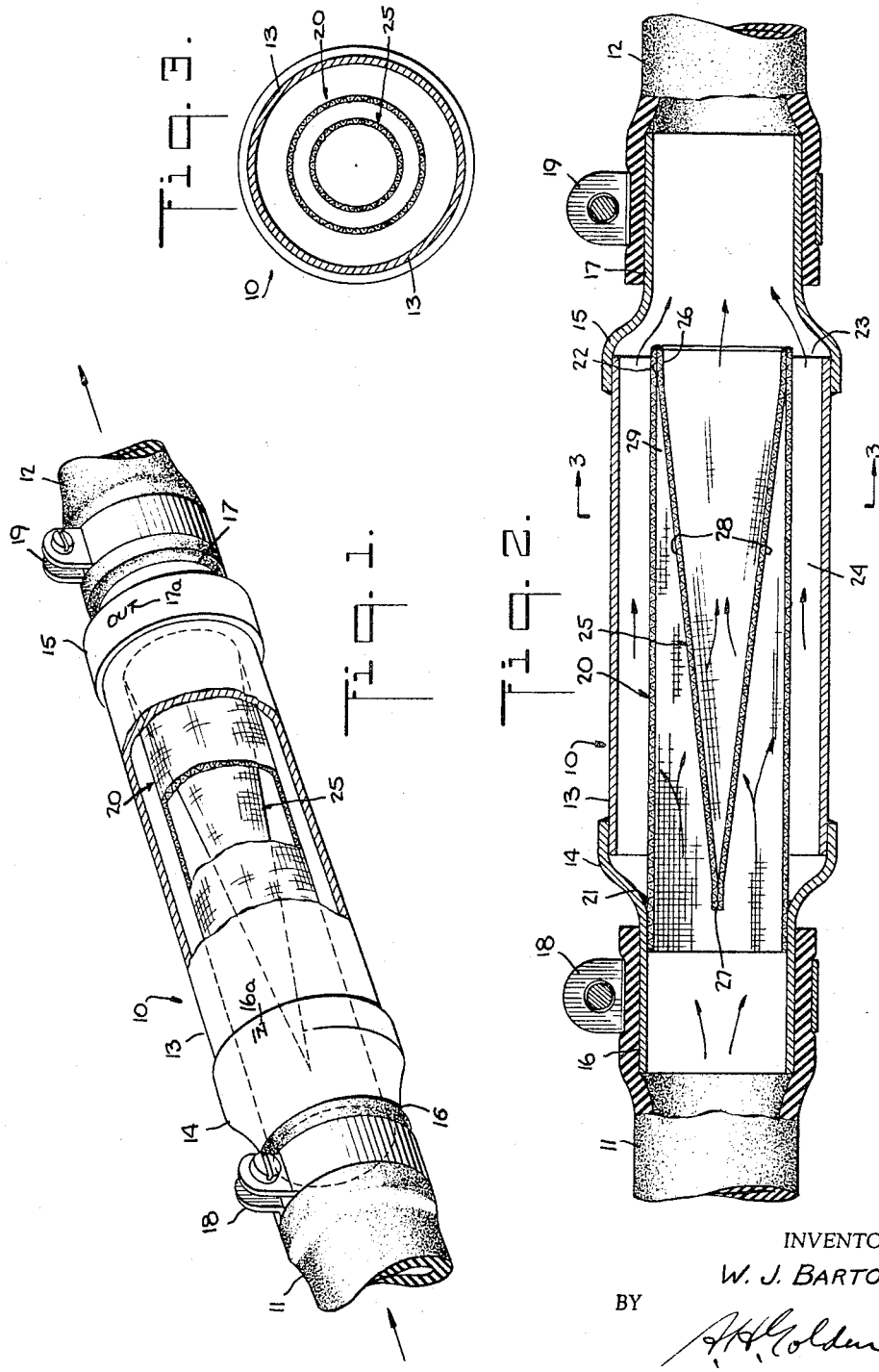

3,280,982
HYDRAULIC SUCTION LINE FILTER
William J. Barto, Philadelphia, Pa., assignor, by mesne assignments, to Eaton Yale & Towne, Inc., a company of Ohio
Filed Dec. 14, 1962, Ser. No. 244,683
2 Claims. (Cl. 210—315)

My invention relates to a novel suction line filter for a hydraulic power circuit.

As will be appreciated, foreign material generally is present in the fluid of a hydraulic power circuit, and it is quite customary to utilize a filter that will prevent the material from circulating with the fluid to the valves, rams or other parts of the circuit. It is preferable that the filter be arranged at a suction line of the circuit, with the filter operating at low pressure. Until the present time, there has not been developed a filter that is entirely satisfactory for the particular purpose, insofar as I am aware.

Thus, the earlier filters soon tend to develop a large pressure drop due to the filtered material that they have collected, so that the filters demand frequent attention. Frequent servicing naturally is objectionable and cannot be permitted when the hydraulic circuit is used in some types of equipment, as for example in an industrial truck. I have conceived by my invention a novel filter that actually is quite simple, but that has parts arranged in an exceedingly, ingenious and effective manner that enables the filter to operate effectively and with little pressure drop over an extended period of time. While frequent servicing will be unnecessary, my filter can very easily be cleaned when that is desired.

In my invention, I arrange what is in effect a fluid passage of a particular diameter that continues in an axial direction through and between the filter inlet and outlet, with a filter member arranged in inclined position in the passage for filtering the axially moving fluid.

A further filter member forms a part of the axial passage about the inclined member, and I prefer to construct those members to coextend with one another in an axial direction. As the inclined member becomes coated with a deposit of material filtered from the axially moving fluid, that member will start to deflect the fluid so that it begins to move in a radial direction through the surface of the further filter member, from which it will move to the filter outlet. I have found that the particular arrangement will enable me to filter the hydraulic fluid effectively for an extended period of time, with only a small pressure drop. Moreover, the parts of my filter, by their arrangement, can be effectively cleaned through a simple procedure, as by applying a reverse flow to the filter.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention in order to prevent the appropriation of my invention by those skilled in the art.

In the drawing:

FIG. 1 shows a perspective view of my novel suction line filter, with parts shown in section.

FIG. 2 is a longitudinal section.

FIG. 3 is a section on line 3—3 of FIG. 2.

Referring now more particularly to the drawing, the novel filter of my invention has a tubular casing 10 that is adapted to be connected between two parts 11, 12 of a hydraulic suction hose. In the construction that I prefer, a medial portion 13 of casing 10 is a length of tubing to which are soldered opposed end parts 14, 15 of ogee shape. Those end parts 14, 15 present aligned inlet and outlet portions 16, 17 that have a relatively small diameter, and to which the parts 11, 12 of the suction hose may be attached through the use of clamps 18, 19. Thus, it will be a simple matter to connect or to disconnect my filter, when that is desired. As a guide to facilitate connecting the filter in the proper way, I prefer to distinguish the filter ends by markings shown at 16a and 17a in FIG. 1.

In my invention, I utilize a filter cylinder 20 that is formed from suitable filter material such as wire screen, and that has substantially the same diameter as do the inlet and outlet portions 16, 17 of the casing. I connect the filter cylinder 20 at one end 21 to the casing inlet 16, as by soldering, with the cylinder 20 in position extending past the medial portion 13 of casing 10, and the opposed end 22 of the cylinder in aligned relation to the outlet portion 17 of casing 10. In effect, cylinder 20 is a continuation of the inlet portion 16, and it may be said that cylinder 20 forms part of an axially aligned passage extending through and between the inlet and outlet portions 16, 17. It will be well to note at this point that the end 22 of filter cylinder 20 actually terminates somewhat short of casing outlet 17, as best seen in FIG. 2, thus forming an opening 23 whereby a circular chamber 24 about cylinder 20 is in direct communication with outlet 17.

I further equip my filter with a filter cone 25 having a base 26 that is secured in the end 22 of cylinder 20, as by soldering. As will be seen in FIG. 2, filter cone 25 extends across the inner circumference of filter cylinder 20 while coextending in an axial direction and having its apex 27 substantially in aligned relation to the first end 21 of cylinder 20. In the construction that I prefer and that I show in the drawing, the filter cylinder 20 and cone 25 are so proportioned that filter surface 28 on cone 25 is inclined at about one in eight, relatively to the axial direction of fluid movement through cylinder 20. I have found that that proportion enables my filter to operate very well, when cone 25 and cylinder 20 are formed from 50 mesh wire screen. Of course, it is conceivable that a different proportion may be utilized, and therefore I do not wish to be limited to the particular proportion.

It will be appreciated that my construction comprises a passage that will tend to direct fluid in an axial direction through the filter. Thus, fluid entering through the inlet 16 will tend to continue in an axial direction through the interior of filter cylinder 20, moving through the surface of cone 25 and then through outlet 17, still in an axial direction. Some fluid naturally may move through the surface of filter cylinder 20, but in general the direction of movement will at first be axial. As the filter operates, filtered material will start to coat the surface 28 of filter cone 25. Some of the material will be carried by the axially moving fluid along the surfaces of filter cylinder 20 and filter cone 25, and will be collected in a circular space 29 between converging end parts of cylinder 20 and cone 25, thus prolonging the filtering action of the cone.

As the inclined surface 28 of cone 25 becomes coated with filtered material, that surface will begin to direct the axially moving fluid, that impinges against it, in a radial direction toward the surface of cylinder 20. The fluid then will be filtered through cylinder 20, moving from that cylinder through the chamber 24 and opening 23 to the casing outlet 17.

I have found that the novel construction I have described will enable my suction line filter to operate for a considerably extended period of time without causing an undue pressure drop between the fluid entering through inlet 16, and the fluid leaving through outlet 17. Moreover, my filter actually is quite simple and may be rather small, yet by the novel construction of its parts my filter will collect a very considerable amount of filtered material before cleaning becomes necessary.

Nevertheless, my filter can very readily be cleaned when that is desired. Thus, my filter will easily be disconnected from one or both parts 11, 12 of the suction hose. The filter then can be flushed, as for example by applying a reverse flow of cleaning fluid. The reverse flow entering through the filter outlet 17 will tend to move in an axial direction through the filter cone 25, removing the filtered material from the surface of the cone. However, because of the presence of the end 22 of cylinder 20 near the outlet 17, which now is the inlet, a part of the reverse pressure will act through the opening 23 and circular space 24 to clean the filter cylinder 20. The pressure also will act through both the cone and the cylinder to remove material that is collected in the space 29. Thereby, it is possible with the expenditure of relatively little time and effort, to clean my filter and to replace it in the suction line of a hydraulic circuit.

I believe that those persons who are skilled in the art will now understand the construction and the advantages of the novel suction line filter that I have conceived by my invention. I believe, therefore, that the very considerable merits of my invention will be fully appreciated.

I now claim:

1. In a low pressure fluid filter of the class described,
a tubular casing including aligned inlet and outlet portions of a lesser diameter than a medial portion of the casing and adapted each to be connected to a part of a suction line,
a filter cylinder having substantially the same diameter as said inlet and outlet portions and a cylindrical end portion of the filter integrally connected to the tubular inlet portion in the casing permitting initial fluid flow in a direction only internally of said filter cylinder, the opposed end of the cylinder being aligned with the casing outlet,
said opposed end of the cylinder terminating short of said outlet so that a circular chamber about said cylinder is in direct communication with said outlet,
a filter cone having its base secured in said opposed end of the filter cylinder and its apex substantially in aligned relation to the first end of the cylinder so that the cone axially coextends with the cylinder permitting fluid flow through one or the other of said filters to minimize the pressure drop as fluid passes through the filter,
said filter cone presenting an inclined filter surface that extends across the path of fluid that may flow in axial direction between the inlet and outlet portions of the casing,
said inclined filter surface being effective as it becomes coated with filtered material to direct radially through the cylinder surface so as to be filtered by said cylinder,
and connected parts of the filter cone and filter cylinder forming a circular space that collects filtered material which may be carried along the cone and cylinder surfaces by axially moving fluid.

2. In a low pressure fluid filter of the class described,
a tubular casing including aligned inlet and outlet portions of a lesser diameter than a medial portion of the casing and adapted each to be connected to a part of a suction line,
a filter cylinder, a cylindrical end portion of said filter connected integrally to the inlet portion in the casing and having substantially the same diameter as said inlet and outlet portions, in effect forming a continuation of said inlet portion for a movement of fluid in axial direction between the inlet and outlet portions of the casing,
the opposed end of said filter cylinder terminating short of the outlet portion of the casing so as to leave an opening through which a circular chamber about the cylinder is in direct communication with the casing outlet,
a filter cone having its base secured in said opposed end of the filter cylinder and its apex substantially extending into aligned relation to the first end of said cylinder,
said filter cone presenting an inclined filter surface coextending in an axial direction with the filter cylinder and also extending across said cylinder whereby to separate filtered material from the fluid that moves axially,
said filter cone and cylinder being made of a material causing substantially the same pressure drop in said liquid,
converging parts of the cone and cylinder forming a circular space collects filtered material which may be carried along the cone and cylinder surfaces by the axially moving fluid,
said fluid passing only through said cone or said cylinder to minimize the pressure drop through the filter,
and the inclined filter surface being effective as it becomes coated with filtered material to direct the fluid in a radial direction toward the cylinder surface, so as to continue the filtering by movement of the fluid through said cylinder surface and said circular chamber to the casing outlet.

References Cited by the Examiner

UNITED STATES PATENTS

| | | | |
|---|---|---|---|
| 664,280 | 12/1900 | Leland | 210—448 |
| 911,388 | 2/1909 | Franke | 210—497 X |
| 1,582,450 | 4/1926 | Chester. | |
| 1,768,643 | 7/1930 | Summers | 210—448 X |
| 2,427,320 | 9/1947 | Zech | 210—315 X |
| 2,661,845 | 12/1953 | Sullivan | 210—448 |
| 2,669,358 | 2/1954 | Young | 210—460 |
| 3,074,558 | 1/1963 | Huntowski | 210—315 |

REUBEN FRIEDMAN, *Primary Examiner.*

HARRY B. THORNTON, *Examiner.*

F. W. MEDLEY, *Assistant Examiner.*

UNITED STATES PATENT OFFICE
CERTIFICATE OF CORRECTION

Patent No. 3,280,982                              October 25, 1966

William J. Barto

It is hereby certified that error appears in the above numbered patent requiring correction and that the said Letters Patent should read as corrected below.

Column 3, line 63, after "direct" insert -- fluid --; column 4, line 17, after "in" insert -- an --; line 37, after "space" insert -- that --.

Signed and sealed this 5th day of September 1967.

(SEAL)
Attest:

ERNEST W. SWIDER                               EDWARD J. BRENNER
Attesting Officer                                   Commissioner of Patents